(12) United States Patent
Riaz et al.

(10) Patent No.: US 11,168,583 B2
(45) Date of Patent: Nov. 9, 2021

(54) SYSTEMS AND METHODS FOR COOLING COMPONENTS WITHIN A GAS TURBINE ENGINE

(71) Applicant: GENERAL ELECTRIC COMPANY, Schenectady, NY (US)

(72) Inventors: Shahi Riaz, West Carrollton, OH (US); Daniel Jean-Louis Laborie, West Chester, OH (US)

(73) Assignee: General Electric Company, Schenectady, NY (US)

( * ) Notice: Subject to any disclaimer, the term of this patent is extended or adjusted under 35 U.S.C. 154(b) by 831 days.

(21) Appl. No.: 15/217,506

(22) Filed: Jul. 22, 2016

(65) Prior Publication Data

US 2018/0023416 A1    Jan. 25, 2018

(51) Int. Cl.
*F01D 25/14* (2006.01)
*F02C 7/18* (2006.01)
(Continued)

(52) U.S. Cl.
CPC .......... *F01D 25/14* (2013.01); *F01D 17/145* (2013.01); *F01D 17/16* (2013.01); *F01D 25/12* (2013.01); *F01D 25/24* (2013.01); *F02C 7/18* (2013.01); *F02C 7/264* (2013.01); *F28D 15/0241* (2013.01); *F28D 15/0266* (2013.01); *F28D 15/0275* (2013.01); *F28D 15/04* (2013.01); *F05D 2220/30* (2013.01); *F05D 2260/208* (2013.01); *F05D 2260/213* (2013.01);
(Continued)

(58) Field of Classification Search
None
See application file for complete search history.

(56) References Cited

U.S. PATENT DOCUMENTS 3,094,301 A    6/1963   Taylor
4,565,243 A *  1/1986   Ernst ................... F28D 15/0241
                                                   165/104.26

(Continued)

FOREIGN PATENT DOCUMENTS

CN    101122260 A    2/2008
EP    1 884 625 A2   2/2008
(Continued)

OTHER PUBLICATIONS

International Search Report and Written Opinion issued in connection with corresponding PCT Application No. PCT/US2017/042894 dated Jan. 5, 2018.
(Continued)

*Primary Examiner* — Ninh H. Nguyen
*Assistant Examiner* — Jason Fountain
(74) *Attorney, Agent, or Firm* — Dority & Manning, P.A.

(57) ABSTRACT

A passive heat exchanger includes an evaporator section including a heat exchange surface formed complementary to a surface of a gas turbine engine component to be cooled. The heat exchange surface is configured to be thermally coupled in conductive contact to the component surface. The heat exchanger further includes a condenser section coupled in passive convective flow communication with the evaporator section, and a working fluid contained within the evaporator section and the condenser section and configured to passively convect heat from the evaporator section to the condenser section.

16 Claims, 5 Drawing Sheets

(51) Int. Cl.
*F01D 17/14* (2006.01)
*F01D 17/16* (2006.01)
*F01D 25/12* (2006.01)
*F01D 25/24* (2006.01)
*F02C 7/264* (2006.01)
*F28D 15/02* (2006.01)
*F28D 15/04* (2006.01)
*F28D 21/00* (2006.01)

(52) U.S. Cl.
CPC .............. *F28D 2021/0026* (2013.01); *F28D 2021/0028* (2013.01); *Y02T 50/60* (2013.01)

(56) References Cited

U.S. PATENT DOCUMENTS

| | | | |
|---|---|---|---|
| 4,921,041 A | 5/1990 | Akachi | |
| 5,975,841 A * | 11/1999 | Lindemuth | F01D 5/181 415/114 |
| 6,202,403 B1 * | 3/2001 | Laborie | B64D 33/08 60/39.83 |
| 6,446,706 B1 * | 9/2002 | Rosenfeld | F28D 15/0241 165/104.26 |
| 7,090,165 B2 * | 8/2006 | Jones | B64D 29/08 244/53 R |
| 7,673,832 B2 | 3/2010 | Meister | |
| 7,823,374 B2 | 11/2010 | Venkataraniani et al. | |
| 7,845,159 B2 | 12/2010 | Venkataramani et al. | |
| 7,900,437 B2 | 3/2011 | Venkataramani et al. | |
| 8,069,907 B2 * | 12/2011 | Bryant | F28D 15/04 165/46 |
| 8,112,998 B2 | 2/2012 | Liu et al. | |
| 8,333,546 B2 * | 12/2012 | Colotte | F01D 17/16 415/36 |
| 8,602,359 B2 | 12/2013 | Stothers | |
| 9,261,309 B2 * | 2/2016 | Wang | F28D 15/0266 |
| 9,371,743 B2 * | 6/2016 | Snyder | F01M 11/0458 |
| 9,982,601 B2 * | 5/2018 | Heims | F01M 11/02 |
| 2004/0069470 A1 | 4/2004 | Gorbulsky | |
| 2008/0179047 A1 * | 7/2008 | Yesin | F28D 15/0241 165/104.33 |
| 2009/0071632 A1 * | 3/2009 | Bryant | F28D 15/0241 165/104.26 |
| 2010/0158663 A1 * | 6/2010 | Colotte | F01D 17/16 415/33 |
| 2010/0236217 A1 | 9/2010 | Venkataramani et al. | |
| 2010/0307721 A1 * | 12/2010 | Wang | F28D 15/0266 165/104.26 |
| 2014/0165570 A1 * | 6/2014 | Herring | F02C 7/14 60/730 |
| 2015/0099453 A1 | 4/2015 | Eleftheriou et al. | |
| 2015/0191238 A1 | 7/2015 | Hucker et al. | |
| 2016/0115864 A1 | 4/2016 | Campbell et al. | |
| 2016/0305279 A1 | 10/2016 | Gerstler et al. | |
| 2016/0348582 A1 * | 12/2016 | Heims | F01D 25/18 |
| 2017/0184026 A1 | 6/2017 | Elbibary et al. | |
| 2018/0216535 A1 * | 8/2018 | Hill | B23P 15/14 |

FOREIGN PATENT DOCUMENTS

| | | |
|---|---|---|
| EP | 2148045 A1 | 1/2010 |
| EP | 1884628 B1 | 11/2016 |
| GB | 2 435 521 A | 8/2007 |
| WO | 9207227 A1 | 4/1992 |

OTHER PUBLICATIONS

Combined Chinese Office Action and Search Report Corresponding to Application No. 201780045505 dated Jul. 31, 2020.

\* cited by examiner

SYSTEMS AND METHODS FOR COOLING COMPONENTS WITHIN A GAS TURBINE ENGINE

BACKGROUND

The field of the disclosure relates generally to gas turbine engines and, more particularly, to cooling systems for components within a gas turbine engine.

Gas turbine engines, such as turbofans, generally include an undercowl compartment as part of the engine architecture. As turbofans are improved, pressure ratios therein are increased resulting in higher engine and undercowl temperatures. Undercowl components include electronic components such as full authority digital engine (or electronics) controls (FADECs). Furthermore, undercowl components also include non-electronic components such as a variable stator vane (VSV) actuator, variable bleed valve (VBV) actuator, high-pressure turbine active clearance control (HP-TACC) valve, and low-pressure turbine active clearance control (LPTACC) valve. The undercowl components generally include a complex shape with a geometry defined in a plurality of orientations that may be particularly sensitive to increasing temperatures during engine operation and engine soak-back, wherein undercowl components remain in a static operation for a period of time after engine shutdown.

At least some known turbofans cool the undercowl components with an active cooling system which includes an electrical fan with dedicated cooling channels and heat radiation shields. Use of the active cooling system increases engine weight which also increases fuel consumption. Moreover, during soak-back, because the engine is shutdown, electrical power to the electrical fan needs to be provided by an aircraft, thereby increasing aircraft weight and increasing aircraft battery size. If the electrical fan is not installed for soak-back cooling, the increased component temperature may be a hazard to maintenance personnel, maintenance and servicing operations after engine operation may be extended. Other known turbofans position the undercowl components at remote locations within the turbofan. However, some undercowl components are unable to be remotely located, while other undercowl components that are able to be remotely located require increased connection components and complicate overall engine maintenance and servicing.

BRIEF DESCRIPTION

In one aspect, a passive heat exchanger is provided. The passive heat exchanger includes an evaporator section including a heat exchange surface formed complementary to a surface of a gas turbine engine component to be cooled. The heat exchange surface is configured to be thermally coupled in conductive contact to the component surface. The heat exchanger further includes a condenser section coupled in passive convective flow communication with the evaporator section, and a working fluid contained within the evaporator section and the condenser section and configured to passively convect heat from the evaporator section to the condenser section.

In another embodiment, a gas turbine engine is provided. The gas turbine engine includes an engine and a nacelle at least partially surrounding the engine defining an undercowl space therein. An undercowl component is coupled proximate to the engine and positioned within the undercowl space. The undercowl component includes a surface to be cooled. The gas turbine engine further includes a component cooling system. The component cooling system includes a passive heat exchanger. The passive heat exchanger includes an evaporator section including a heat exchange surface formed complementary to the undercowl component surface. The heat exchange surface is configured to be thermally coupled in conductive contact to the undercowl component surface. The heat exchanger further includes a condenser section coupled in passive convective flow communication with the evaporator section, and a working fluid contained within the evaporator section and the condenser section and configured to passively convect heat from the evaporator section to the condenser section.

In yet another aspect, a method of cooling a component of a gas turbine engine is provided. The component includes a surface to be cooled positioned in an undercowl space of the gas turbine engine. The method includes providing a passive heat exchanger including an evaporator section and a condenser section coupled in passive convective flow communication with the evaporator section, the evaporator section includes a heat exchange surface. Forming the heat exchange surface complementary to the component surface such that the heat exchange surface is thermally coupled in conductive contact to the component surface. Receiving heat into the evaporator section from the gas turbine engine component. The method further includes passively transferring heat through the evaporator section to the condenser section through a working fluid contained within the evaporator section and the condenser section.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of a cooling system as described herein provide a flexible heat exchanger that facilitates cooling gas turbine engine components having complex surfaces. The improved cooling facilitates increasing the component's life-cycle. Specifically, the heat exchanger includes an evaporator section thermally coupled to the engine component positioned in an undercowl space such that the evaporator section contours to and at least partially surrounds the engine component. In some embodiments, the heat exchanger includes a vapor chamber having the evaporator section coupled to the engine component and a condenser section at an external surface which is exposed to cooler temperatures. In other embodiments, the heat exchanger includes the evaporator section defined by a spreader coupled to the engine component and a condenser section defined by a plurality of fins positioned in a cooler engine area. The spreader and fins are thermally coupled through a closed loop flexible heat pipe. In each embodiment, the heat exchangers conform to the engine components such that low resistance thermal heat transfer is facilitated with resistance to engine vibration. Furthermore, the heat exchangers are passive heat exchangers that do not require electrical power and can function during engine soak-back. Each heat exchanger also reduces overall engine weight, which increases engine efficiency.

Figure 1:
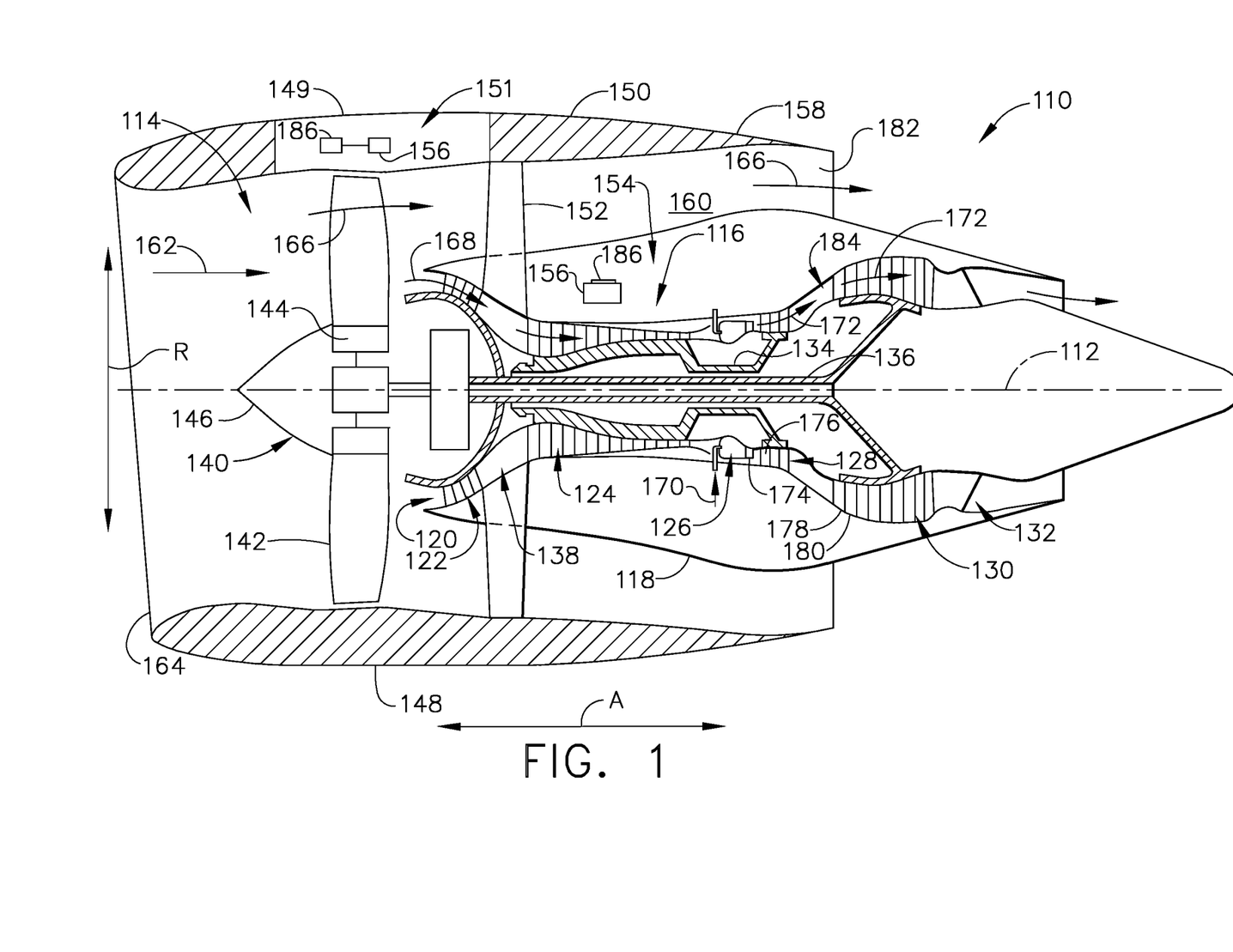
FIG. 1 is a schematic, cross-sectional illustration of an exemplary gas turbine engine in accordance with an example embodiment of the present disclosure.

FIG. 1 is a schematic cross-sectional view of a gas turbine engine in accordance with an exemplary embodiment of the present disclosure. In the exemplary embodiment, the gas turbine engine is a high-bypass turbofan jet engine 110, referred to herein as "turbofan engine 110." As shown in FIG. 1, turbofan engine 110 defines an axial direction A (extending parallel to a longitudinal centerline 112 provided for reference) and a radial direction R (extending perpendicular to longitudinal centerline 112). In general, turbofan engine 110 includes a fan case assembly 114 and a gas turbine engine 116 disposed downstream from fan case assembly 114.

Gas turbine engine 116 includes a substantially tubular outer casing 118 that defines an annular inlet 120. Outer casing or core cowl 118 encases, in serial flow relationship, a compressor section including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to LP compressor 122. The compressor section, combustion section 126, turbine section, and exhaust nozzle section 132 together define an air flow path 138.

In the exemplary embodiment, fan case assembly 114 includes a fan 140 having a plurality of fan blades 142 coupled to a disk 144 in a spaced apart manner. As depicted, fan blades 142 extend outwardly from disk 144 generally along radial direction R. Fan blades 142 and disk 144 are together rotatable about longitudinal centerline 112 by LP shaft 136.

Referring still to the exemplary embodiment of FIG. 1, disk 144 is covered by a rotatable front hub 146 aerodynamically contoured to promote an airflow through plurality of fan blades 142. Additionally, exemplary fan case assembly 114 includes an annular fan casing or outer nacelle 148 that circumferentially surrounds fan 140 and/or at least a portion of gas turbine engine 116. Nacelle 148 includes a fan cowl 149 that surrounds fan 140 and defines a fan compartment 151. Further, nacelle 148 includes, a middle or cowling section 150 defined around LP compressor 122, HP compressor 124, combustion section 126, and/or HP turbine 128 and is supported relative to gas turbine engine 116 by an outlet guide vane assembly 152. Between core cowl 118 and gas turbine engine 116, an undercowl space or core compartment 154 is defined therein. Within undercowl space 154, engine components 156 are positioned. Components 156 are generally coupled to gas turbine engine 116 and include, for example, and without limitation, electronic components such as full authority digital engine (or electronics) controls (FADECs), and/or non-electronic components such as a variable stator vane (VSV) actuator, variable bleed valve (VBV) actuator, high-pressure turbine active clearance control (HPTACC) valve, low-pressure turbine active clearance control (LPTACC) valve, LP compressor anti-ice valve, ignition boxes, and others. Engine components 156 may also be positioned within fan compartment 151 at outer nacelle 148. Moreover, a downstream section 158 of nacelle 150 may extend over an outer portion of gas turbine engine 116 so as to define a bypass airflow passage 160 therebetween.

During operation of turbofan engine 110, a volume of air 162 enters turbofan engine 110 through an associated inlet 164 of nacelle 148 and/or fan case assembly 114. As air 162 passes across fan blades 142, a first portion of air 162 as indicated by arrows 166 is directed or routed into bypass airflow passage 160 and a second portion of air 162 as indicated by arrows 168 is directed or routed into air flow path 138, or more specifically into booster compressor 122. The ratio between first portion of air 166 and second portion of air 168 is commonly known as a bypass ratio. The pressure of second portion of air 168 is then increased as it is routed through HP compressor 124 and into combustion section 126, where it is mixed with fuel 170 and burned to provide combustion gases 172.

Combustion gases 172 are routed through HP turbine 128 where a portion of thermal and/or kinetic energy from combustion gases 172 is extracted via sequential stages of HP turbine stator vanes 174 that are coupled to outer casing 118 and HP turbine rotor blades 176 that are coupled to HP shaft or spool 134, thus causing HP shaft or spool 134 to rotate, thereby supporting operation of HP compressor 124. Combustion gases 172 are then routed through LP turbine 130 where a second portion of thermal and kinetic energy is extracted from combustion gases 172 via sequential stages of LP turbine stator vanes 178 that are coupled to outer casing 118 and LP turbine rotor blades 180 that are coupled to LP shaft or spool 136, thus causing LP shaft or spool 136 to rotate, thereby supporting operation of booster compressor 122 and/or rotation of fan 140. Combustion gases 172 are subsequently routed through jet exhaust nozzle section 132 of gas turbine engine 116 to provide propulsive thrust. Simultaneously, the pressure of first portion of air 166 is substantially increased as first portion of air 166 is routed through bypass airflow passage 160, including through outlet guide vane assembly 152 before it is exhausted from a fan nozzle exhaust section 182 of turbofan engine 110, also providing propulsive thrust. HP turbine 128, LP turbine 130, and jet exhaust nozzle section 132 at least partially define a hot gas path 184 for routing combustion gases 172 through gas turbine engine 116.

In the exemplary embodiment, during and after operation of turbofan engine 110, engine components 156 positioned in both undercowl space 154 and fan compartment 151 may absorb heat and increase in temperature. To control the temperature of engine components 156, a passive cooling system 186 is coupled to engine components 156 providing thermal management thereto. Cooling system 186 will be discussed further below in reference to FIGS. 2-5.

It should be appreciated, however, that the exemplary turbofan engine 110 depicted in FIG. 1 is by way of example only, and that in other exemplary embodiments, turbofan engine 110 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, a military purpose engine, and a marine or land-based aero-destructive engine. Additionally or alternatively, engine 110 may be incorporated into an aircraft, a rotorcraft, a drone, a balloon, and other types of flying machines.

Figure 2:
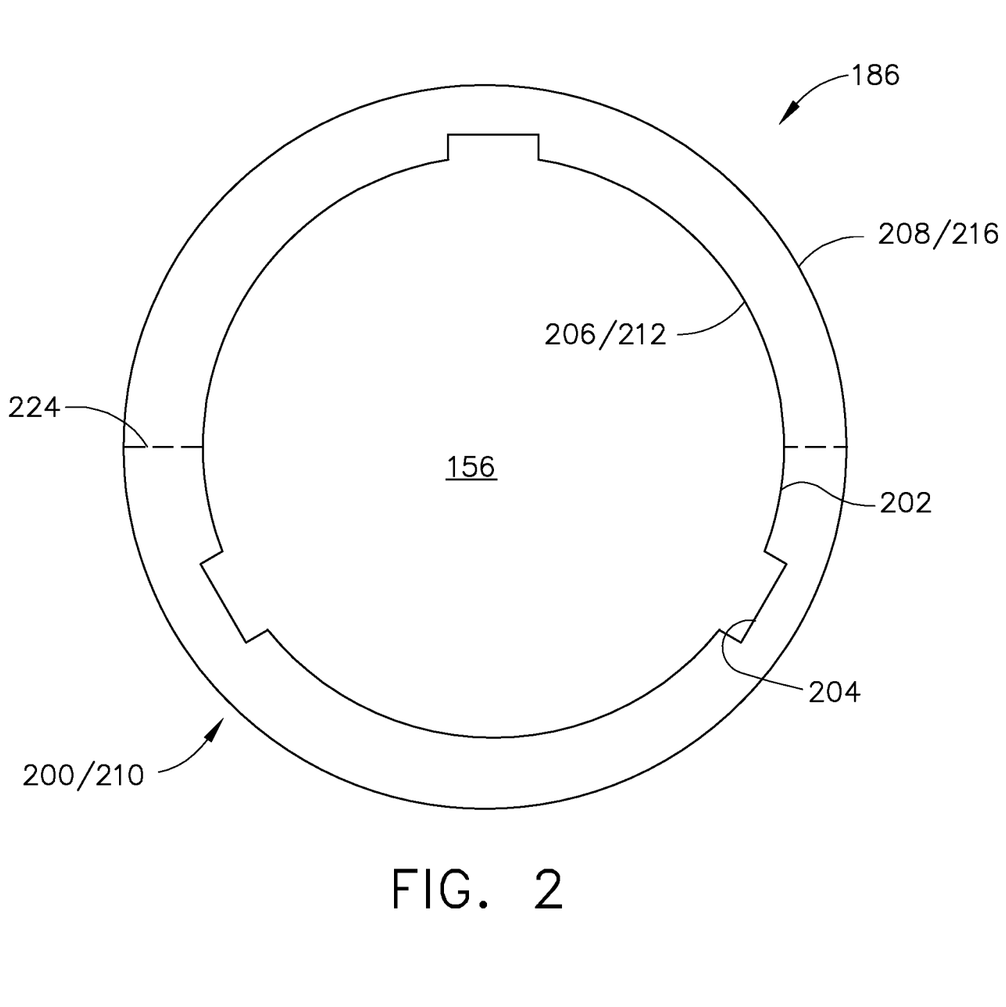
FIG. 2 is a schematic, cross-sectional view of an exemplary cooling system coupled to an engine component of the turbofan engine shown in FIG. 1.
Figure 3:
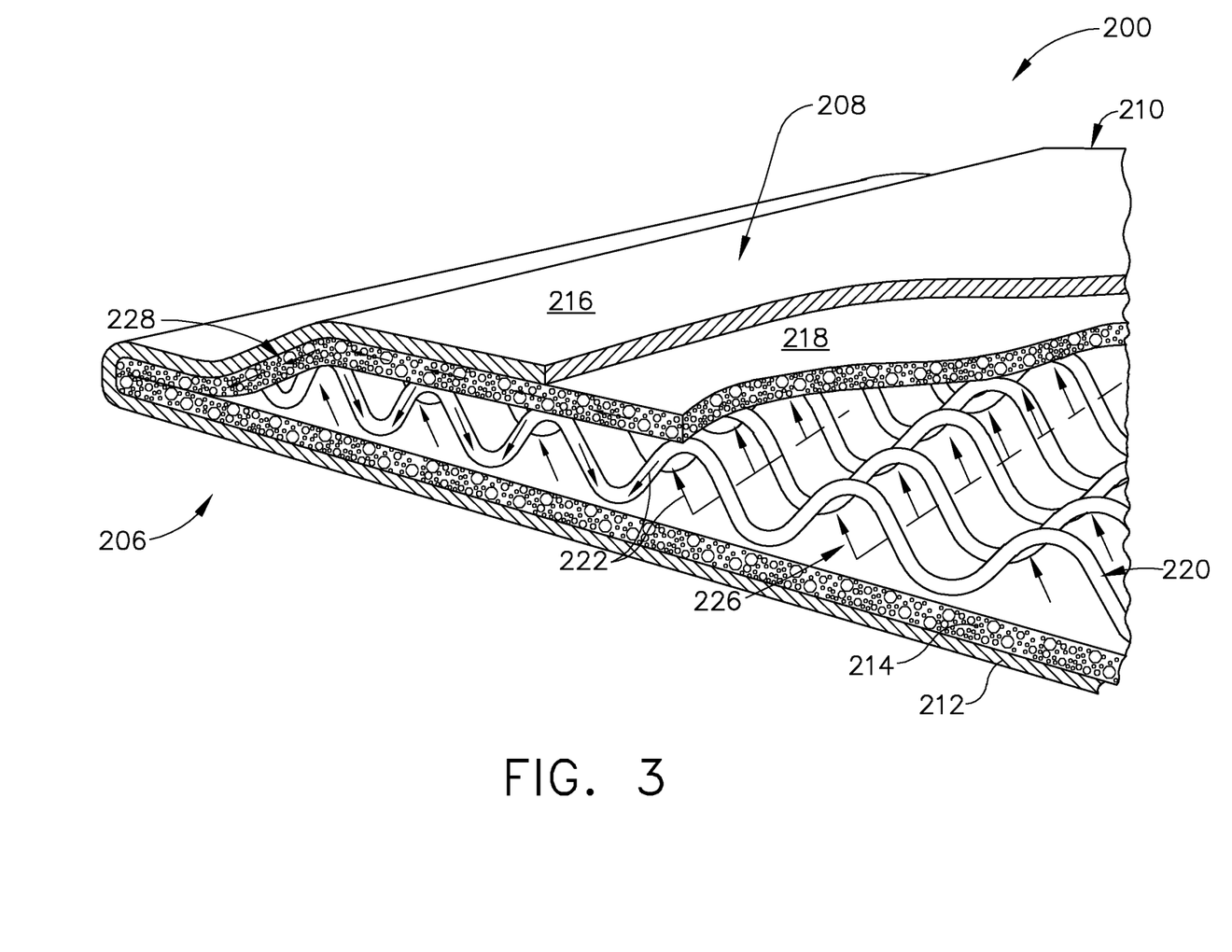
FIG. 3 is a perspective view of an exemplary heat exchanger for the cooling system shown in FIG. 2.

FIG. 2 is a schematic cross-sectional view of an exemplary cooling system 186 coupled to engine component 156 of turbofan engine 110 (shown in FIG. 1). FIG. 3 is a perspective view of an exemplary heat exchanger 200 for cooling system 186 illustrated in FIG. 2. Referencing FIGS. 2 and 3, cooling system 186 includes heat exchanger 200 thermally coupled to engine component 156. In the exemplary embodiment, engine component 156 includes a complex outer surface 202 defined in a plurality of orientations. For example, engine component 156 is a HPTACC valve having a substantially cylindrical shape with a plurality of projections 204 extending therefrom such that HPTACC valve has a complex geometry. In alternate embodiments, engine component 156 includes any other engine component, such as, but not limited to, VBV actuator, VSV actuator, LPTACC valve, LP compressor anti-ice valve, FADEC, ignition box, and others.

In the exemplary embodiment, heat exchanger 200 is a passive device that includes an evaporator section 206 and a condenser section 208. Specifically, heat exchanger 200 includes a vapor chamber 210 as illustrated in FIG. 3. Vapor chamber 210 includes evaporator section 206 defined by a first heat exchange surface 212 adjacent to an evaporation wick 214. Opposite and spaced approximately equidistant with respect to evaporator section 206 is condenser section 208 defined by a second surface 216 adjacent to a condensing wick 218. A vapor zone 220 is defined between evaporator section 206 and condenser section 208 and includes a series of corrugated baffles 220 extending between evaporation wick 214 and condensing wick 218. Vapor chamber 210 further includes a working fluid 222 contained therein. In alternative embodiments, heat exchanger 200 has any other configuration that enables cooling system 186 to function as described herein.

Evaporator section 206 of heat exchanger 200 is thermally coupled directly to and in conductive contact with engine component 156 such that evaporator section 206 is formed complementary to, contours to, and at least partially surrounds outer surface 202. Specifically, heat exchanger 200 is flexible and/or conformable to the complex shape of engine component 156. For example, heat exchanger 200 facilitates conforming to projections 204 within outer surface 202. In the exemplary embodiment, heat exchanger 200 surrounds outer surface 202 such that engine component 156 is covered by heat exchanger 200. In alternative embodiments, heat exchanger 200 only partially surrounds engine component 156 as illustrated by area 224 in FIG. 2.

During turbofan engine 110 operation, engine component 156 may be subjected to a thermal load. To cool and transfer heat out of engine component 156, heat exchanger 200 is thermally coupled to engine component 156 such that evaporator section 206 is coupled to a heat source which is engine component 156. Condenser section 208 is exposed to air, such as air 162 (shown in FIG. 1) channeled through undercowl space 154 and/or fan compartment 151 or to ambient air, both which has a lower temperature than engine component 156. Engine component 156 heats evaporation wick 214 and working fluid 222 entrained therein is vaporized 226. Vaporized working fluid 226 moves through vapor zone 220 in a plurality of directions until it meets condensing wick 218, adjacent to a cooled surface, such as condenser section 208, wherein vaporized working fluid 226 condenses and turns back into a liquid state 228. Liquid working fluid 228 is then channeled back to evaporation wick 214 where the cooling process and thermal transfer repeats itself providing cooling to engine component 156.

Working fluid 222 is determined by the operating conditions of turbofan engine 110. In the exemplary embodiment, working fluid 222 includes water ($H_2O$). Water facilitates working fluid 22 freezing at low temperature such that overcooling of component 156 is avoided, for electronic components this reduces thermal fatigue and solder joint cracking. In alternative embodiments, working fluid 222 is any other fluid that enables heat exchanger 200 to function as described herein. For example, for high operating temperatures and high heat absorption, working fluid 222 may include Lithium (Li), Magnesium (Mg), or Zinc (Zn). For low operating temperatures and low heat absorption, working fluid 222 may include Ammonia ($NH_3$), Ethel Alcohol ($C_2H_5OH$), or Methyl Alcohol ($CH_3OH$).

Vapor chamber 210 facilitates a light weight passive convection cooling system 186 as compared to conventional heat pipe solutions. Specifically, vapor chamber 210 has an interior chamber structure that is lighter than solid materials. Furthermore, vapor chamber 210 allows for direct contact to the heat source reducing thermal contact resistance, uniform spreading of heat over a large surface area and in a plurality of directions, and the ability to withstand engine vibration due to the proximity of condenser section 208 to evaporator section 206. Additionally, vapor chamber 210 may be manufactured in a variety of multifaceted shapes to contour to different shapes of engine components 156.

Figure 4:
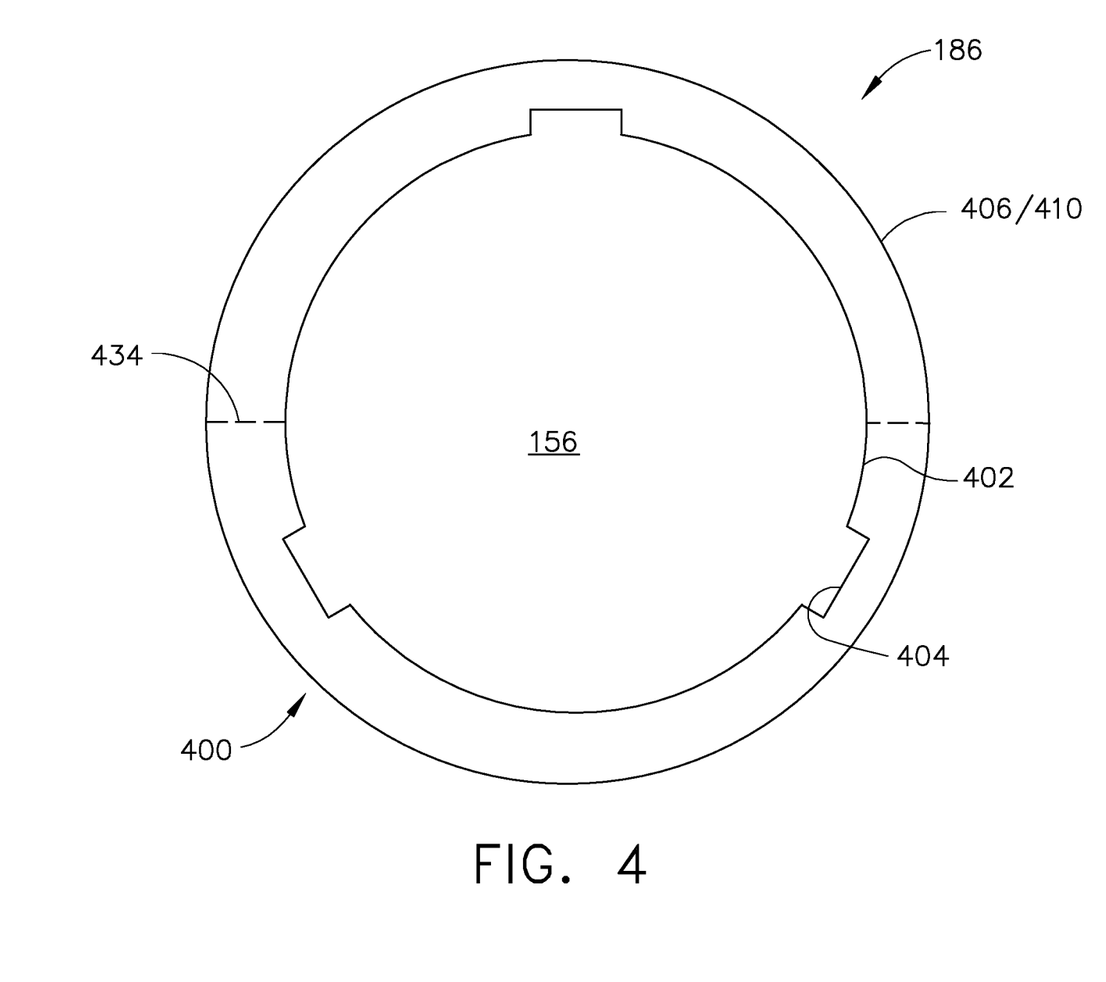
FIG. 4 is a schematic, cross-sectional view of another exemplary cooling system coupled to an engine component of the turbofan engine shown in FIG. 1.
Figure 5:
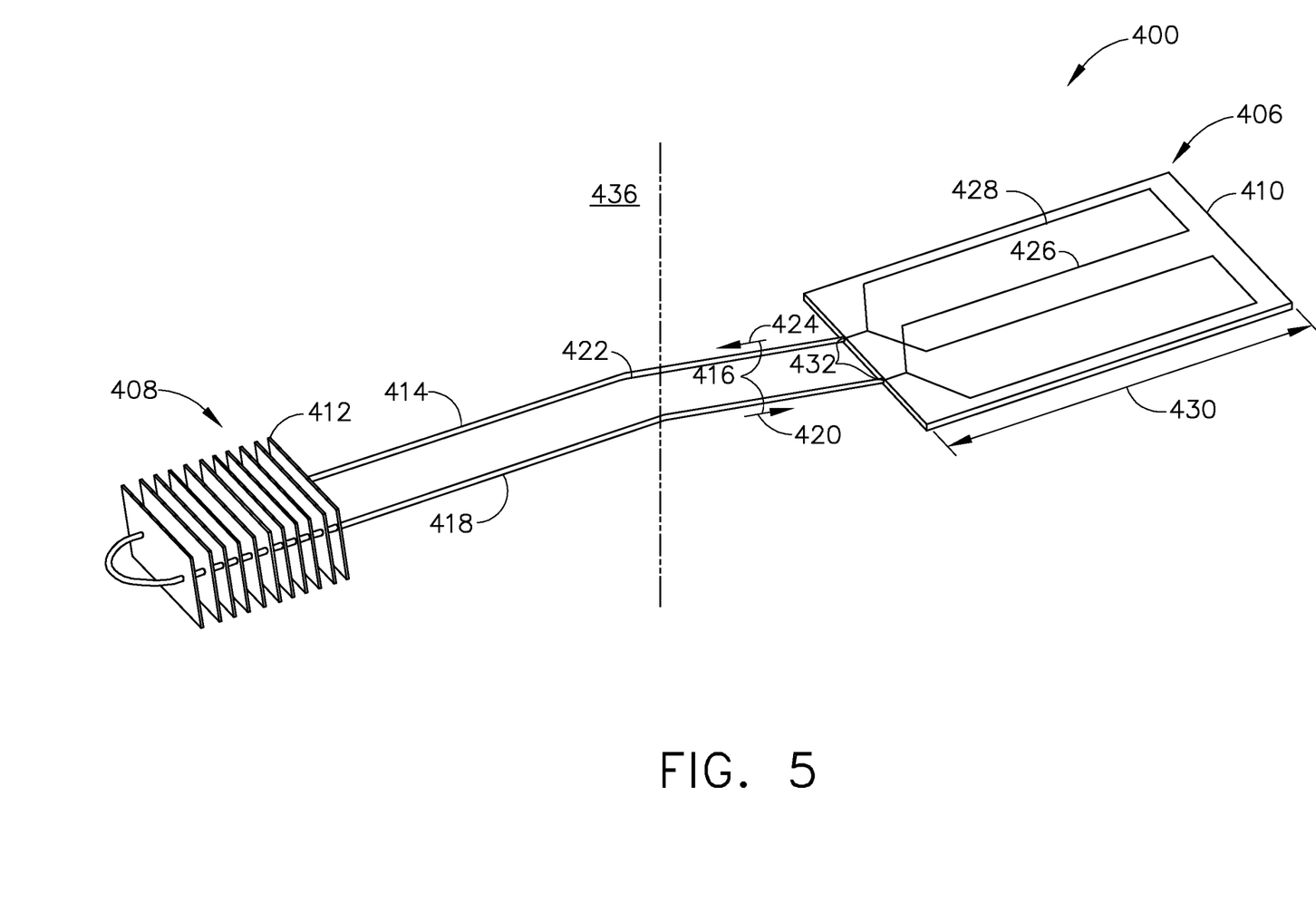
FIG. 5 is a perspective view of an exemplary heat exchanger for the cooling system shown in FIG. 4.

FIG. 4 is a schematic cross-sectional view of an exemplary cooling system 186 coupled to engine component 156 of turbofan engine 110 (shown in FIG. 1). FIG. 5 is a perspective view of an exemplary heat exchanger 400 for cooling system 186 illustrated in FIG. 4. Referencing FIGS. 4 and 5, cooling system 186 includes heat exchanger 400 thermally coupled to engine component 156. In the exemplary embodiment, engine component 156 includes a complex outer surface 402 defined in a plurality of orientations.

For example, engine component 156 is a HPTACC valve having a substantially cylindrical shape with a plurality of projections 404 extending therefrom such that HPTACC valve has a complex geometry. In alternate embodiments, engine component 156 includes any other engine component, such as, but not limited to, VBV actuator, VSV actuator, LPTACC valve, LP compressor anti-ice valve, FADEC, ignition box, and others.

In the exemplary embodiment, heat exchanger 400 is a passive device that includes an evaporator section 406 and a separate condenser section 408 as illustrated in FIG. 5. Heat exchanger includes evaporator section 406 defined by a spreader 410 acting as a heat exchange surface. Opposite to evaporator section 406 is condenser section 408 defined by a plurality of external cooling fins 412. Evaporator section 406 is thermally coupled to condenser section 408 through a closed loop flexible heat pipe 414. Flexible heat pipe 414 includes a working fluid 416 contained therein. Specifically, a first section 418 of heat pipe 414 contains a liquid wick that facilitates channeling liquid working fluid 420 from condenser section 408 to evaporator section 406 and a second section 422 of heat pipe 414 contains a vapor wick that facilitates channeling vaporized working fluid 420 from evaporator section 406 to condenser section 408. At evaporator section 406, heat pipe 414 is thermally coupled and embedded within spreader 410. For example, first section 418 of heat pipe 414 splits into two channels 426 and 428 within spreader 410, runs substantially an entire length 430 of spreader 410, and returns substantially the entire length 430 of spreader 410 converging back to a single channel second section 422. At condenser section 408, each fin 412 is thermally coupled to first section 418 and second section 422. In alternative embodiments, heat exchanger 400 has any other configuration that enables cooling system 186 to function as described herein.

In the exemplary embodiment, flexible heat pipe 414 is coupled to spreader 410 via a weld 432. For example, flexible heat pipe 414 is a titanium convoluted tube, while spreader 410 and fins 412 are aluminum. In alternative embodiments, heat exchanger 400 materials can be any other materials that enable heat exchanger 400 to function as described herein.

Evaporator section 406 of heat exchanger 400 is thermally coupled directly to and in conductive contact with engine component 156 such that evaporator section 406 forms complementary to, contours to, and at least partially surrounds outer surface 402. Specifically, spreader 410 is flexible and/or conformable to the complex shape of engine component 156. For example, spreader 410 facilitates conforming to projections 404 within outer surface 402. In the exemplary embodiment, spreader 410 surrounds outer surface 402 such that engine component 156 is covered by spreader 410. In alternative embodiments, spreader 410 only partially surrounds engine component 156 as illustrated by area 434 in FIG. 4.

During turbofan engine 110 operation, engine component 156 may be subjected to a thermal load. To cool and transfer heat out of engine component 156, heat exchanger 400 is thermally coupled to engine component 156 such that evaporator section 406 is coupled to a heat source which is engine component 156. Condenser section 408 is positioned away from engine component 156 in an engine area 436 that has a lower temperature than engine component 156. For example, condenser section 408 may be located within nacelle inlet 164 (shown in FIG. 1). In alternative embodiments, condenser section 408 may be located in any other turbofan engine 110 compartment that enables heat exchanger 400 to function as described herein, for example, condenser section 408 may be located within undercowl space 154 (shown in FIG. 1) or a fan compartment 151 (shown in FIG. 1). In another example, condenser section 408 may be coupled to a cold bulky structure of engine 110 that acts as a heat sink during engine operation and engine soak-back, for example, a fan frame that is exposed to ambient or fan air, or a nacelle portion exposed to ambient or fan air. Engine component 156 heats evaporator section 406 including heat pipe 414 embedded in spreader 410 and working fluid 416 entrained within is vaporized 424. Vaporized working fluid 424 moves through second section 422 of heat pipe 414 towards condenser section 408, adjacent to a cooled surface, such as fins 412, wherein vaporized working fluid 424 condenses and turns back into liquid working fluid 420. Liquid working fluid 420 is then channeled back to evaporator section 406 through first section 418 of heat pipe 414 where the cooling process and thermal transfer repeats itself providing cooling to engine component 156.

In the exemplary embodiment, spreader 410 facilitates the transfer of heat from engine component 156 to heat pipe 414 to vaporize 424 the working fluid 416 therein. For example, spreader 410 has a rectangular shape that conforms to engine component 156 such that heat is conducted from engine component 156, through spreader 410, and to heat pipe 414. In alternative embodiments, spreader 410 may be of any other shape and/or material that enables spreader 410 to function as described herein.

Similar to heat exchanger 200 described above in reference to FIGS. 2 and 3, working fluid 416 is determined by the operating conditions of turbofan engine 110. In the exemplary embodiment, working fluid 416 includes water ($H_2O$). In alternative embodiments, working fluid 416 is any other fluid that enables heat exchanger 400 to function as described herein. For example, for high operating temperatures and high heat absorption, working fluid 416 may include Lithium (Li), Magnesium (Mg), or Zinc (Zn). For low operating temperatures and low heat absorption, working fluid 416 may include Ammonia ($NH_3$), Ethel Alcohol ($C_2H_5OH$), or Methyl Alcohol ($CH_3OH$).

Heat exchanger 400 also facilitates a light weight cooling system 186 as compared to conventional heat pipe solutions. Specifically, heat exchanger 400 construction is lighter than solid materials such as copper. Furthermore, spreader 410 allows for direct contact to the heat source reducing thermal contact resistance, and flexible heat pipe 416 has the ability to withstand engine vibration. Additionally, heat exchanger 400 may be manufactured in a variety of multifaceted shapes to contour to different shapes of engine components 156.

The above-described embodiments of a cooling system provide a flexible heat exchanger that facilitates cooling gas turbine engine components having complex surfaces. The improved cooling facilitates increasing the component's life-cycle. Specifically, the heat exchanger includes an evaporator section thermally coupled to the engine component positioned in an undercowl space such that the evaporator section contours to and at least partially surrounds the engine component. In some embodiments, the heat exchanger includes a vapor chamber having the evaporator section coupled to the engine component and a condenser section at an external surface which is exposed to cooler temperatures. In other embodiments, the heat exchanger includes the evaporator section defined by a spreader coupled to the engine component and a condenser section defined by a plurality of fins positioned in a cooler engine area. The spreader and fins are thermally coupled through a closed loop flexible heat pipe. In each embodiment, the heat exchangers conform to the engine components such that low resistance thermal heat transfer is facilitated with resistance to engine vibration. Furthermore, the heat exchangers are passive heat exchangers that do not require electrical power and can function during engine soak-back. Each heat exchanger also reduces overall engine weight, which increases engine efficiency.

An exemplary technical effect of the methods, systems, and apparatus described herein includes at least one of: (a) increasing thermal control of engine components; (b) increasing component efficiency; (c) providing thermal control of engine components without electrical power; (d) decreasing engine weight; and (e) improving engine efficiency.

Exemplary embodiments of methods, systems, and apparatus for the cooling systems are not limited to the specific embodiments described herein, but rather, components of the systems and/or steps of the methods may be utilized independently and separately from other components and/or steps described herein. For example, the methods may also be used in combination with other systems requiring thermal control, and the associated methods, and are not limited to practice with only the systems and methods as described herein. Rather, the exemplary embodiment can be implemented and utilized in connection with many other applications, equipment, and systems that may benefit from thermal control.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A passive heat exchanger comprising:
   an evaporator section comprising a heat exchange surface formed complementary to an outer surface of a component of a gas turbine engine, said heat exchange surface configured to be thermally coupled in conductive contact to the outer surface of the component;
   a condenser section coupled in passive convective flow communication with said evaporator section;
   a working fluid contained within said evaporator section and said condenser section and configured to passively convect heat from said evaporator section to said condenser section; wherein said passive heat exchanger is flexible and/or conformable to the outer surface of the component; and
   a vapor chamber, wherein said vapor chamber comprises:
      a first heat exchange surface proximate to an evaporation wick defining said evaporator section; and
      a second heat exchange surface proximate to a condensing wick defining said condenser section, wherein a vapor zone is defined between said evaporator section and said condenser section containing said working fluid therein.

2. The passive heat exchanger in accordance with claim 1, wherein said heat exchange surface comprises a complex surface.

3. The passive heat exchanger in accordance with claim 1, wherein said first surface and said second surface are spaced approximately equidistance with respect to each other.

4. The passive heat exchanger in accordance with claim 1, wherein said outer surface of the component comprises a complex shape.

5. The passive heat exchanger in accordance with claim 4, wherein said complex shape comprises a plurality of projections.

6. The passive heat exchanger in accordance with claim 4, wherein said passive heat exchanger at least partially surrounds said component of the gas turbine engine.

7. The passive heat exchanger in accordance with claim 1, wherein said component of the gas turbine engine comprises an undercowl component.

8. The passive heat exchanger in accordance with claim 7, wherein said undercowl component comprises a variable stator vane (VSV) actuator, variable bleed valve (VBV) actuator, high-pressure turbine active clearance control (HP-TACC) valve, and low-pressure turbine active clearance control (LPTACC) valve.

9. The passive heat exchanger in accordance with claim 1, wherein said heat exchange surface of said evaporator section comprises a spreader and a heat pipe, wherein the heat pipe is coupled to and/or embedded within the spreader.

10. A gas turbine engine comprising:
    an engine;
    a nacelle at least partially surrounding said engine and defining an undercowl space therein;
    an undercowl component coupled proximate to said engine and positioned within said undercowl space; and
    a passive component cooling system comprising a passive heat exchanger, said heat exchanger comprising:
       an evaporator section comprising a heat exchange surface formed complementary to an outer surface of the undercowl component, said heat exchange surface configured to be thermally coupled in conductive contact to said outer surface of the undercowl component;
       a condenser section coupled in passive convective flow communication with said evaporator section;
       a working fluid contained within said evaporator section and said condenser section and configured to passively convect heat from said evaporator section to said condenser section; and
       a vapor chamber, wherein said vapor chamber comprises:
          a first heat exchange surface proximate to an evaporation wick defining said evaporator section; and
          a second heat exchange surface proximate to a condensing wick defining said condenser section, wherein a vapor zone is defined between said evaporator section and said condenser section containing said working fluid therein;
       wherein said passive heat exchanger is flexible and/or conformable to the outer surface of the undercowl component.

11. The gas turbine engine in accordance with claim 10, wherein said undercowl component comprises a non-electronic component.

12. The gas turbine engine in accordance with claim 10, wherein said undercowl component comprises an electronic component.

13. The gas turbine engine in accordance with claim 10, wherein said heat exchange surface of said evaporator section comprises a spreader and a heat pipe, wherein the heat pipe is coupled to and/or embedded within the spreader.

14. A method of cooling a component of a gas turbine engine, said method comprising:
receiving heat into an evaporator section of a passive heat exchanger, the heat received from a component of a gas turbine engine, the component being positioned in an undercowl space of the gas turbine engine; and
passively transferring heat through the evaporator section to a condenser section of the passive heat exchanger through a working fluid contained within the evaporator section and the condenser section, the condenser section being coupled in passive convective flow communication with the evaporator section, and the evaporator section comprises a heat exchange surface;
wherein said heat exchange surface is complementary to an outer surface of the component of the gas turbine engine such that the heat exchange surface is thermally coupled in conductive contact to said outer surface of the component; and
wherein said passive heat exchanger is flexible and/or conformable to the outer surface of the component and wherein the passive heat exchanger comprises a vapor chamber, the vapor chamber comprising a first heat exchange surface proximate to an evaporation wick defining the evaporator section, and a second heat exchange surface proximate to a condensing wick defining the condenser section, wherein a vapor zone is defined between the evaporator section and the condenser section containing the working fluid therein.

15. The method in accordance with claim 14, wherein said outer surface of the component comprises a complex shape.

16. The method in accordance with claim 14, wherein said heat exchange surface of said evaporator section comprises a spreader and a heat pipe, wherein the heat pipe is coupled to and/or embedded within the spreader.

* * * * *